United States Patent [19]

Beggs et al.

[11] Patent Number: 4,697,051
[45] Date of Patent: Sep. 29, 1987

[54] DATA TRANSMISSION SYSTEM

[75] Inventors: Richard D. Beggs, Duluth; Harold W. Friesen; Wendell G. Nutt, both of Dunwoody, all of Ga.

[73] Assignee: AT&T Technologies Inc., AT&T Bell Laboratories, Berkeley Heights, N.J.

[21] Appl. No.: 760,867

[22] Filed: Jul. 31, 1985

[51] Int. Cl.$^4$ .................... H01B 11/04; H01B 11/10
[52] U.S. Cl. .................... 178/63 D; 174/34; 174/36
[58] Field of Search .............. 178/63 D; 174/32, 34, 174/36; 179/4, 16 C, 16 D, 175.25; 375/36; 455/3, 63; 370/6; 333/25, 244

[56] References Cited

U.S. PATENT DOCUMENTS

| | | | |
|---|---|---|---|
| 3,821,465 | 6/1974 | Karlstedt | 174/34 X |
| 4,058,669 | 11/1977 | Nutt et al. | 174/110 X |
| 4,153,332 | 5/1979 | Longoni | 350/96.24 |
| 4,408,443 | 10/1983 | Brown | 174/34 |
| 4,412,094 | 10/1983 | Dougherty et al. | 174/34 X |
| 4,510,346 | 4/1985 | Bursh et al. | 174/36 |
| 4,533,790 | 8/1985 | Johnston et al. | 174/115 |

OTHER PUBLICATIONS

Brochure—Cable and Wire Telephone Network Equipment.

Primary Examiner—Stafford D. Schreyer
Attorney, Agent, or Firm—Edward W. Somers

[57] ABSTRACT

A parallel data transmission system (20) comprises a cable (40) which is capable of balanced mode transmission but which is driven in an unbalanced mode. The cable includes a plurality of twisted pairs of individually insulated conductors (42—42) enclosed by a metallic shield (54). The twist lengths are relatively short to cause the pairs to be decoupled sufficiently from one another to allow substantially error-free, parallel transmission over relatively long distances. Interposed between the core and the shield is a spacing member (52) which has a relatively low dielectric constant. Receiving facilities are provided for detecting whether the level of transmitted signals is above or below predetermined threshold values and for converting the received signals into one of two or more logic levels. Advantageously, this system increases substantially the distances over which substantially error-free transmission in an unbalanced mode can be accomplished.

22 Claims, 12 Drawing Figures

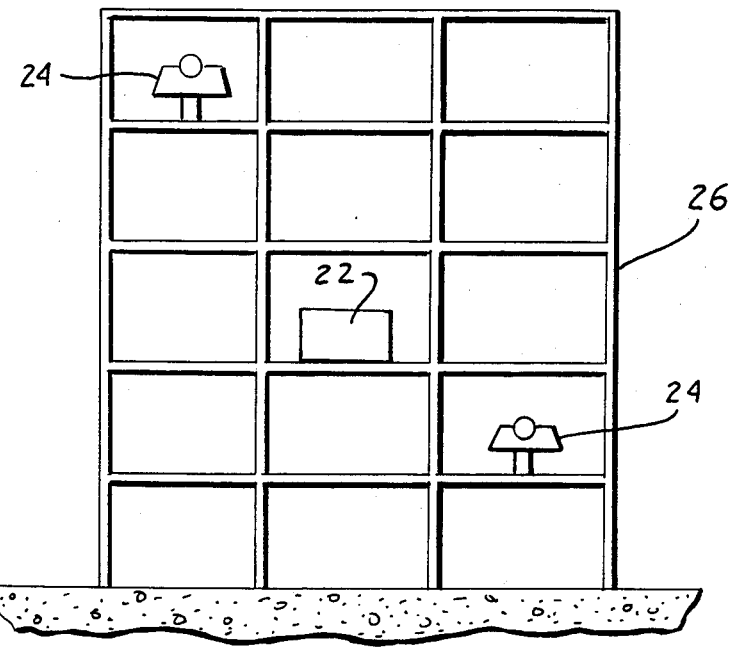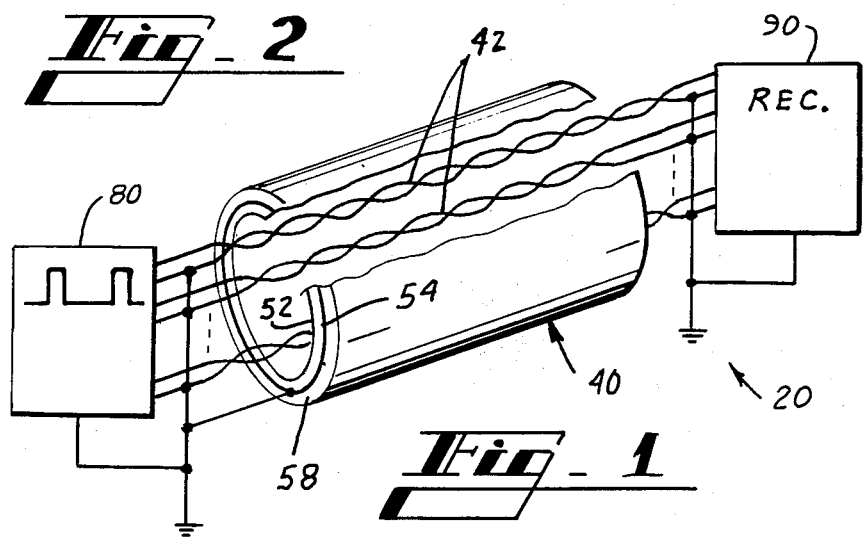

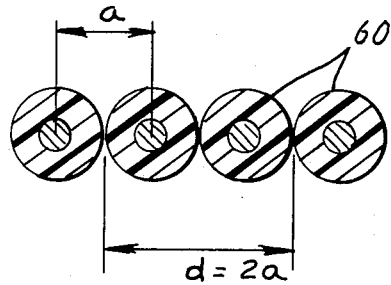
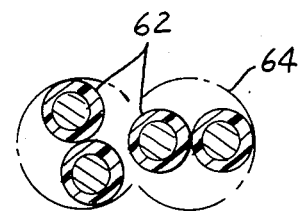
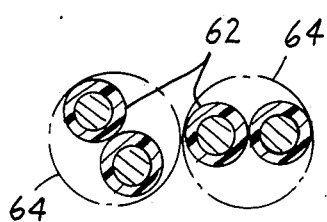
Fig. 8 PRIOR ART
Fig. 9
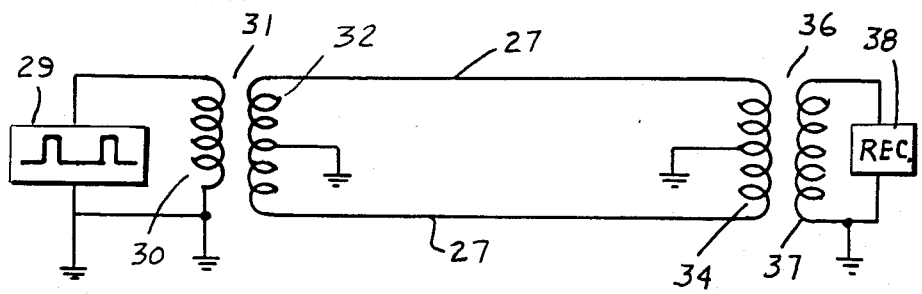
Fig. 3 PRIOR ART
Fig. 4
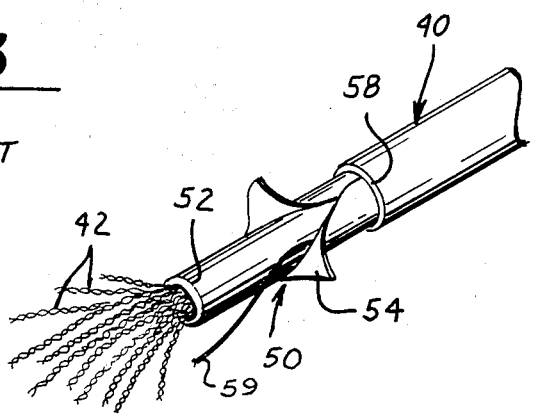

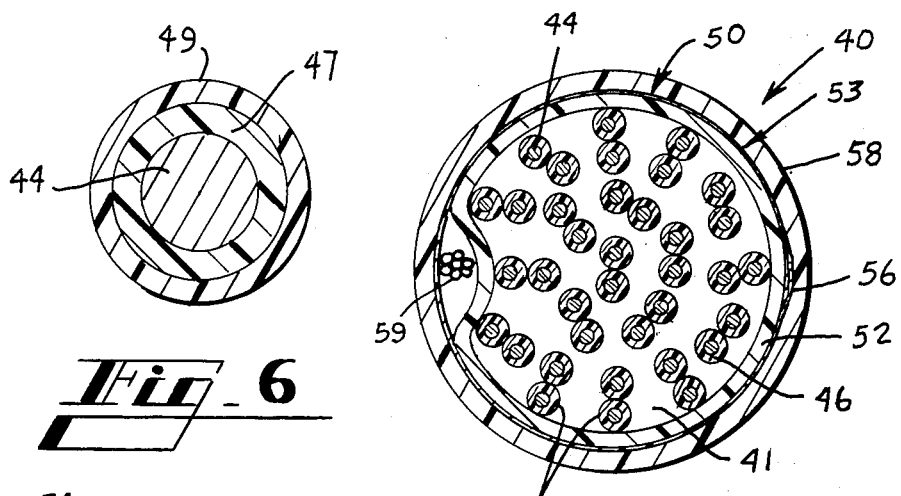
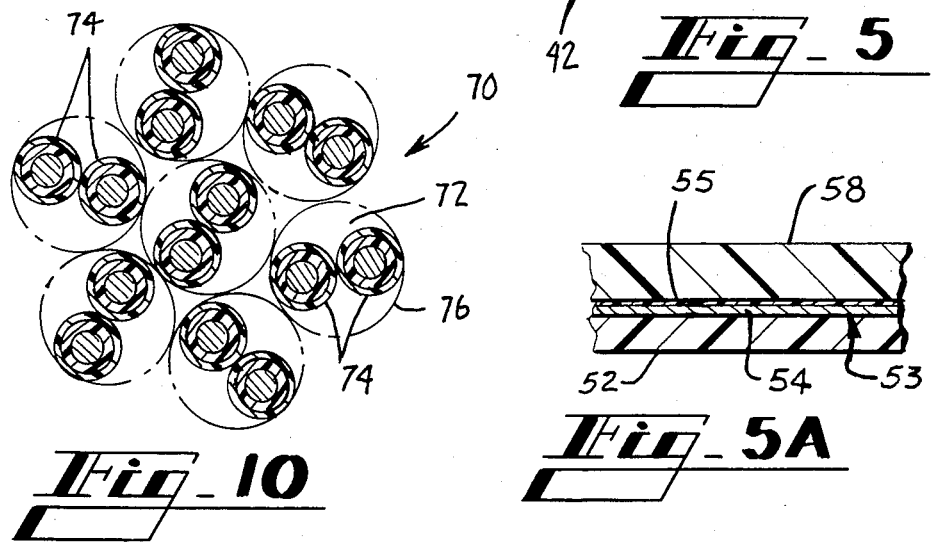
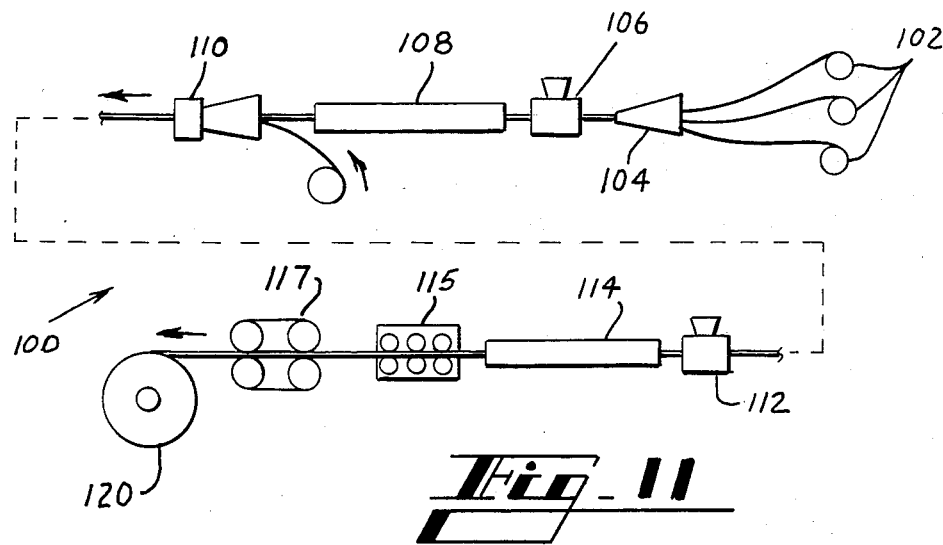

DATA TRANSMISSION SYSTEM

TECHNICAL FIELD

This invention relates to a data transmission system. More particularly, it relates to a computer interface system for connecting high speed peripheral equipment to mainframe computers.

BACKGROUND OF THE INVENTION

Along with the greatly increased use of computers for offices and for manufacturing facilities, there has developed a need for connecting peripheral equipment to mainframe computers. A system which includes a cable for accomplishing the interconnection has long been sought. A number of factors must be considered in order to arrive at a cable design which is readily marketable for such a use.

Cable connectorability is very important and is more readily accomplished with twisted conductor pairs than with any other medium. Cable jackets should exhibit low friction to enhance the pulling of cables into ducts or over supports. The cables should be strong, flexible and crush-resistant, and they should be conveniently packaged and not unduly weighty. Flame retardance also is important.

To satisfy present, as well as future needs, these sought after cables should provide suitable high frequency data transmission. This requires a tractable loss for the distance to be covered, and crosstalk and electromagnetic interference (EMI) performance that will permit substantially error-free transmission. Also, the cables must not contaminate the environment with spurious radiations.

The sought-after system including the data cable should be low in cost. The system including the cable must provide for suitable transmission, yet be capable of being economically installed, be efficient in terms of space required, and be durable.

Installation cost is an important factor. Generally, for cables in buildings, which are used for such interconnection, installation costs outweigh the material costs. Installation costs are affected by the cross-sectional area of the cable. Building cables should have a relatively small cross-section inasmuch as small cables not only enhance installation but are easier to conceal, require less space in ducts and wiring closets and reduce the size of the associated hardware.

Also important to cost is whether or not the system is arranged to provide transmission in what is called a balanced mode. In balanced mode transmission, voltages and currents on the conductors of a pair are equal in amplitude but opposite in polarity. This requires the use of additional components, such as transformers, for example, at end points of the cable between the cable and logic devices thereby increasing the cost of the system. Generally, computer equipment manufacturers have preferred the use of systems characterized by an unbalanced mode inasmuch as most of the industry is not amenable to investing in additional components for each line. In an unbalanced mode transmission system, voltages and currents on the conductors of a pair are not characterized by equality of amplitude and opposition of polarity. Computer equipment manufacturers have adopted unbalanced mode transmission and do not intend to retrofit their equipment in order to simplify the interconnection of peripherals. At the same time, however, peripheral connection arrangements must meet predetermined attenuation and crosstalk requirements.

Of importance to the design of local area network copper conductor cables are the distances over which signals must be transmitted. Often, this need is one for interconnection over a distance of about one hundred and fifty feet or less. This need at transmission rates of 20 kilobits per second or less has been satisfied in the prior art with single jacket cables which may comprise twisted pairs of conductors which are connected directly between a computer, for example, and receiving means such as the peripheral equipment. Additional components at the ends of each pair to convert the transmission to the balanced mode have not been used.

Shielding often is added to each twisted pair to confine its electric and magnetic fields. In this way, susceptibility to electromagnetic interference is reduced. However, as the electric and magnetic fields are confined, resistance, capacitance and inductance all change, each in such a way as to increase transmission loss. For example, the attenuation of one widely used, individually shielded local area network data pair is 50% greater than it would be if it were one of many pairs having a common shield in a typical exchange cable.

On the other hand, a cable shield surrounding all conductor pairs in a cable may be advantageous. Consider that the pairs may be inside a cabinet and may be exposed to high speed digital signals. Stray radiation will be picked up in the longitudinal mode of the twisted pairs. If the pairs are then routed outside the cabinet, they may radiate excessively. If there is a cable shield enclosing the plurality of pairs, the shield may be grounded at the cabinet wall so that the shield will not itself carry stray signals to the outside environment. Thus, a shield disposed about all the pairs in a cable can be effective in preventing electromagnetic interference and yet not increase appreciably the attenuation of each pair.

An escalating need has developed for longer length cables to permit peripheral equipment to be spaced farther from its associated mainframe computer. Studies have shown that almost all station-to-serving closet runs are less than about 200 feet. Given this maximum distance, other parameters of local area network copper conductor cables can be optimized. In the range of distances up to about 200 feet, this need has been filled with coaxial cable comprising the well-known center solid and outer tubular conductor separated by a dielectric material.

The use of coaxial cables, which inherently provide unbalanced transmission, presents several problems. To connectorize coaxial cable is very expensive. Further, for the data transmission arrangements which are contemplated, eighteen conductor pairs or the equivalent thereof are required for each cable. To have eighteen coaxial cables and the connectors associated therewith requires the dedication of an undue amount of building space which is at a premium cost. Of course, the use of coaxial cables does not require components such as transformers at each end to provide balanced mode transmission, but the size and connectorization of coaxial cables outweigh this advantage.

Seemingly, the solution of the prior art to the problem of providing a data transmission system between a mainframe computer and peripheral equipment are not totally satisfying in today's world. What is needed and what is not provided by the prior art is a data transmission system which is compatible with unbalanced mode transmission computer equipment but which does not involve the need for additional components at the terminus of each line. Further, any arrangement proposed as a solution to the problem should be one which does not occupy an undue amount of space and one which facilitates a simplistic connection arrangement. There is a need to provide cables that can transmit data streams of many megabits, error free, from stations to closets or between computer cabinets separated by comparable distances to main rooms, be readily installed, fit easily into building architectures, and be safe and durable.

SUMMARY OF THE INVENTION

The foregoing problems have been overcome by the system of this invention and by the methods of making a cable of the system. The system of this invention includes a cable which is capable of high rate transmission of data streams. Included in the data transmission system is a cable which is capable of balanced mode transmission. The cable comprises a core which includes a plurality of twisted pairs of individually insulated conductors wherein the twist lengths are relatively short to cause the pairs to be decoupled sufficiently from one another to allow substantially error free transmission over relatively long distances. The cable also includes a sheath system which includes an inner jacket and a metallic shield, which protects the cable against electromagnetic interference. The inner jacket which is interposed between the core and the shield spaces the conductor pairs from the shield and thereby reduces the amount by which the shield increases signal loss, and also reduces crosstalk currents between pairs. Also, the system includes driving means for causing the cable to transmit data signals in an unbalanced mode and receiving means for detecting whether the signal level is above or below predetermined threshold values and for converting the received signals into one of two or more logic levels. In a preferred embodiment, the cable includes a jacket which encloses the metallic shield. In one embodiment, the transmission of the data streams is unidirectional and synchronous.

A method of making a cable for use in a substantially error free data transmission system comprises the steps of advancing a metallic conductor along a path of travel, providing the metallic conductor with an insulation cover, and associating two of the metallic conductors to provide a pair of conductors. The conductors are twisted about each other to form a twisted pair having a relatively short twist length. The method also includes the step of gathering together a plurality of the twisted pairs to provide a core. Advantageously, the relatively short twist lengths and the manner in which the gathering is accomplished substantially avoids the meshing of adjacent pairs of the conductors. The core is enclosed in an inner jacket which is made of a dielectric material, and the inner jacket is enclosed with a metallic shield. Then the shield is enclosed in an outer jacket which is made of a plastic material.

BRIEF DESCRIPTION OF THE DRAWINGS

Other features of the present invention will be more readily understood from the following detailed description of specific embodiments thereof when read in conjunction with the accompanying drawings, in which:

FIG. 1 is a schematic view of a system of this invention for providing substantially error-free data transmission in an unbalanced mode over relatively long distances;

FIG. 2 is an elevational view of a building to show a mainframe computer and printers linked by the system of this invention;

FIG. 3 is a schematic view of a prior art arrangement for balanced mode transmission;

FIG. 4 is a perspective view of a cable of the system of this invention, the cable including a core of twisted conductor pairs and a sheath system;

FIG. 5 is an end view of the cable of FIG. 4;

FIG. 5A is a detail view of a portion of the cable of FIG. 5;

FIG. 6 is an enlarged end view of an insulated conductor of the preferred embodiment of the cable of FIG. 4;

FIG. 7 is an end view of two insulated conductor pairs;

FIG. 8 is a simplified cross-sectional end view showing insulated conductor pairs that physically share space inside a sheath system;

FIG. 9 shows an enlarged cross-sectional end view of insulated conductor pairs without physical space sharing;

FIG. 10 is a simplified cross-sectional end view of a portion of the preferred embodiment of the cable of this invention showing each conductor pair having a circumscribed space to provide controlled space sharing; and FIG. 11 shows a schematic view of a manufacturing line for making the cable of the system of this invention.

DETAILED DESCRIPTION

Referring now to FIG. 1, there is shown a data transmission system which is designated generally by the numberal 20. Typically the system 20 may be used to interface between a mainframe computer 22 and peripheral equipment 24 on that same or different floors of a building 26 (see FIG. 2). The peripheral equipment 24 may include a high speed printer, for example. Desirably, the interconnection system minimizes interference on the system in order to provide substantially error-free transmission. This becomes particularly important inasmuch as data often is transmitted synchronously along a plurality of twisted conductor pairs.

A balanced mode prior art transmission system which includes a plurality of pairs of individually insulated conductors 27—27 is shown in FIG. 3. Each pair of conductors 27—27 is connected from a digital signal source 29 through a primary winding 30 of a transformer 31 to a secondary winding 32 which is center-tap grounded. The conductors are connected to a winding 34 of a transformer 36 at the receiving end. A winding 37 of the transformer 36 is connected to a receiver 38. In a balanced mode, the system may experience of an electromagnetic interference spike, but a null appears in both conductors of a pair which results in no change in the received signal. With regard to outside interference, whether it be from power induction or other radiated fields, the electric currents cancel out at the output end. For unbalanced transmission, these currents are minimized by a cable shield which encloses the plurality of conductor pairs.

Computer equipment manufacturers frequently have not found it adviseable to use balanced mode transmission, primarily because of costs. For unabalanced mode transmission, it is unnecessary to connect additional components such as transformers into circuit boards at the ends of each conductor pair.

The system 20 of this invention is directed to providing substantially error-free data transmission in an unbalanced mode. Advantageously, the system 20 of this invention uses a balanced pair cable in an unbalanced mode. This avoids the need for additional terminus equipment and renders the system 20 compatible with present equipment. Further, there is a requirement that the outer diameters of any cable used in the system 20 not exceed a predetermined value. The system 20 includes a cable 40 (see FIG. 1) which has a relatively small outer diameter thereby overcoming the size problem encountered when using a plurality of coaxial cables. In one embodiment, the outer diameter of the cable 20 is only about 0.4 inch.

More particularly, the system 20 of this invention includes a cable 40 (see FIGS. 4 and 5) which includes a core 41 comprising a plurality of twisted pairs of individually insulated conductors 42—42. In a preferred embodiment, the core comprises eighteen twisted conductor pairs. Each conductor 42 includes a metallic portion 44 and an insulation cover 46. In a preferred embodiment which is shown in FIG. 6, the insulation cover comprises an inner layer 47 of cellular material such as, for example, expanded polyethylene and an outer skin layer 49 of a solid plastic material such as polyvinyl chloride.

The core 41 is enclosed in a sheath system 50 (see again FIGS. 4 and 5). The sheath system includes an inner jacket 52 which comprises a material having a relatively low dielectric constant. In a preferred embodiment, the inner jacket 52 is a plastic material, and more particularly, a polyvinyl chloride material. Further, the thickness of the inner jacket is in the range of about one-third to three times the outer diameter of an insulated conductor 42. That outer diameter is often referred to as diameter-over-dielectric (DOD). In a preferred embodiment in which the metallic portion 44 is 26 gauge copper, the outer diameter of the insulated conductor 0.026 inch and the thickness of the inner jacket is about 0.015 inch.

The inner jacket 52 is enclosed in a laminate 53 (see FIGS. 5 and 5A) comprising a metallic shield 54 and a plastic film 55 and having a longitudinally extending overlapped seam 56. The laminate is arranged so that the plastic film faces outwardly. In a preferred embodiment, the thickness of the metallic shield 54, which typically is made of aluminum, is 0.002 inch whereas the thickness of the film is 0.0009 inch. A drain wire 59, which may be a stranded or a solid wire, is disposed between the shield 54 and the inner jacket 52. The metallic shield 54 is enclosed in an outer jacket 58 which comprises a plastic material such as polyvinyl chloride, for example. In a preferred embodiment, the thickness of the outer jacket 58 is about 0.025 inch.

The inner jacket functions as a buffer which causes the outer pairs in the core to behave as inner pairs with respect to attenuation. Otherwise, the closer a pair of insulated conductors is to the metallic shield, the higher the attenuation. The inner jacket 52 may take other forms, as long as it comprises a material having a relatively low dielectric constant. For example, the inner jacket 52 may comprise a material in strip form which is wrapped helically or longitudinally about the core.

It has been found that the losses experienced with the above-described cable are approximately the same as for a non-shielded cable. Because the electromagnetic fields of the conductor pairs of the cable share space therebetween, the transmission losses are lower than if the conductor pairs were shielded individually.

Crosstalk performance for the multi-pair cable 40 is somewhat less than in multiple coaxial cables, or in cables having individually shielded pairs, but is acceptable and it is acceptable in a cable which meets stringent size requirements. The crosstalk performance of the cable 40 is achieved because of a relatively short twist length for the conductor pairs, because of a relatively thin insulation cover and because of loose packing of the conductor pairs.

The twist length of each conductor pair falls in a range which is about 10 to 70 times the outer diameter (DOD) of the insulation cover 46 of each conductor of the pair. For a 26 gauge copper conductor, the twist length falls in the range of about 0.25 to 1.6 inches. In a preferred embodiment, the twist of each conductor pair is a constant value, which is 0.5 inch.

As can be seen in FIG. 6, the insulation cover of the preferred embodiment is relatively thin. For example, the insulation cover varies between about 0.1 to 1.0 times the diameter of the metallic conductor 44. Further, insulation layers 47 and 49 of the preferred embodiment are about 0.0025 and 0.002 inch, respectively.

Thirdly, the plurality of conductor pairs are assembled so that the pairs are loosely packed. This is completely opposite to those objectives of cables made in the past for exchange use in telephone communications. There, it was most desirable to cause adjacent pairs to mesh together to increase the density or the number of pairs in as little an area as possible. The loose packing of the cable 40 of this invention, which is accomplished by the use of the relatively short twist lengths and by the method in which the plurality of conductor pairs are gathered together to form the core 41, minimizes the opportunity for a conductor of one pair to interlock physically with a conductor of an adjacent pair.

In order to understand the packing parameter and its effect on crosstalk, attention is directed now to FIG. 7, where there is shown a schematic view of two pairs of insulated conductors 60—60. The conductors of each pair are spaced apart to distance "a" and the centers of the pairs spaced apart a distance "d" equal to twice the distance "a". The crosstalk between pairs is proportional to the quantity $a^2/d^2$. Accordingly, the greater the distance "d" between the centers of the conductor pairs, the less the crosstalk.

As can be seen in FIG. 8, it is commonplace in packed cores for at least one individually insulated conductor 62 of one pair to invade the space of another pair as defined by a circumscribing circle 64. For the pairs of individually insulated conductors 62—62 shown in FIG. 8 there is relatively high capacitance and low impedance. The transmission loss is proportional to the square root of the quotient of capacitance and inductance. Accordingly, for a twisted pair of conductors having relatively thin walled insulation such as the pair shown in FIG. 8, the loss is relatively high.

On the other hand, compare FIG. 8 with FIG. 9 in which neither conductor 62 of one pair invades the circle-circumscribed space of another pair. On the average, along the length of conductor pairs associated together in the cable 40, the centers of the pairs will be spaced apart the distance "d". This results in lower attenuation and reduced crosstalk.

If a pair of conductors is confined in a metallic shield, the capacitance increases, there is no space sharing, and, as in coaxial cable, the transmission loss is higher. The shield is effective in terminating the field that otherwise would extend out from the conductors into the shared space. As such, the shield is very effective in retaining all the electromagnetic energy inside its periphery, but the transmission loss increases. Although there is higher loss with a shielded pair, the crosstalk is lower. As should be apparent, the conductor pairs in FIG. 9, which are not individually shielded, share the electromagnetic space therebetween, but not the physical space of each pair as defined by the circumscribing circles.

Referring now to FIG. 10, there is shown in enlarged view of a portion of a cable core 70 of the preferred embodiment of the cable 40 of this invention. The core 70 comprises a plurality of pairs 72—72 of individually insulated conductors 74—74. About each of the conductor pairs is drawn a circle 76 having a diameter which is equal to twice the outer diameter of an insulated conductor 74. The circle 76 is said to circumscribe the conductor pair. The short twist length and the method of gathering together the conductor pairs effectively reduces pair meshing and causes each conductor pair to behave as though disposed in a cylinder having a diameter of twice the outer diameter of an insulated conductor.

Because of the manner in which the conductor pairs are assembled together and because of the relatively short twist length, the conductors of each pair tend to remain within their associated circumscribing circle. Although the pairs of the cable have shared space insofar as electromagnetic fields are concerned, there is little, if any, sharing of the physical spaces defined by the circumscribing circles. As a result, the transmission loss between pairs is maintained at a low level and crosstalk between pairs is acceptable.

The system 20 also includes facilities 80 (see FIG. 1) for driving each pair of insulated conductors of the cable 40 in an unbalanced mode. These facilities include an unbalanced solid state driver, which is well known in the art, such as, for example, a driving chip designated 2T3456 and manufactured by the Texas Instruments Company.

Further, the system 20 includes receiving facilities 90 for detecting whether the level of the transmitted signal is above or below predetermined threshold values. The facilities 90 also include a solid state unbalanced receiver device which is capable of converting the received signals into one of two or more logic levels. A typical receiving facility which is available commercially is one designated 2T3457 and manufactured by the Texas Instruments Company. Unlike the balanced mode system shown in FIG. 3, the system 20 includes direct coupled driving and receiving facilities without any intermediate components for each pair between the conductors of the pair and the logic devices.

Although FIG. 1 depicts only three conductor pairs extending between the driving facilities 80 and the receiving facilities 90, it should be understood that all pairs of the cable extend therebetween. All conductor pairs may be connected to ports of one driving chip, for example. Further, one conductor of each pair serves as a return conductor and all return conductors are tied together to ground potential at one or both ends of the cable 40. The relatively short twist length assures that for a large percent of the higher transmission frequencies, the return current returns on the mate of a given pair. This tends to reduce crosstalk.

The system of this invention improves the rate at which data can be transmitted error-free. A common prior art limitation has been a maximum of 20 kilobits of data per second at a capacitance for each pair of 2500 picofarads which often entails a distance limitation of 150 feet. With the cable 40 and system 20 of the invention, transmission speeds of 3000 kilobits per second over each conductor pair over a distance of 200 feet have been achieved. Also, different pairs may simultaneously be transmitting signals all in the same direction or some pairs may transmit in one direction and others in the opposite direction. Further, the data streams on different pairs may be either synchronous or asynchronous.

Referring now to FIG. 11, there is shown a view of apparatus designated generally by the numeral 100 for making the cable 40 of the system of this invention. The apparatus includes a plurality of reels 102—102 each holding a twisted pair of insulated conductors. As will be recalled, the twist length of each pair is relatively short. Also, the conductor of each pair in a preferred embodiment has been insulated on a separate line with dual layers of insulation one of which is an expanded or cellular plastic material.

The plurality of pairs of insulated conductors are advanced from the reels 102—102 and directed through a device 104 which is referred to as a gathering die. The gathering die 104 is sized so that when the conductor pairs with their relatively short twist lengths are assembled together into the core 41, each pair has a controlled circumscribing circle 76 as shown in FIG. 10.

Afterwards, the core 41 is advanced through an extruder 106 whereat the inner jacket 52 of plastic material is extruded thereover. The jacketed core is advanced through a trough 108 wherein water cools the inner jacket. Then the jacketed core is advanced through an apparatus 110 such as that shown in W. D. Bohannon U.S. Pat. No. 4,404,720 which issued on Sept. 20, 1983 and which is incorporated by reference hereinto wherein the metallic laminate 53 is applied to form a longitudinal seam. A stranded drain wire 59 is caused to be positioned between the metallic shield 54 and the inner jacket and then the shielded cable core is moved through another extruder 112 wherein the outer jacket 58 is provided over the shield. The cable is moved through another cooling trough 114. From there, the cable 40 is advanced past a printer 115 by a capstan 117 and caused to be taken up on a reel 120.

It should be understood that the above-described arrangements are simply illustrative of the invention. Other arrangements may be devised by those skilled in the art which will embody the principles of the invention and fall within the scope and spirit thereof.

What is claimed is:

1. A data transmission system, which comprises:
   a cable which is capable of balanced mode transmission, said cable comprising:
   a core which includes a plurality of twisted pairs of individually insulated conductors wherein the twist lengths are relatively short to cause the pairs to be decoupled sufficiently from one another to allow substantially error free data transmission over relatively long distances;
   a metallic shield which enclosed said core;
   an inner jacket which is interposed between said core and said metallic shield and which has a relatively low dielectric constant, said inner jacket comprising a plastic material having a thickness in the range of about one-third to three times the outer diameter of each insulated conductor; and an outer jacket which encloses said metallic shield; driving means for causing the cable to transmit data signals in an unbalanced mode; and means receiving the transmitted data signals for detecting whether the level of the transmitted data signals is above or below a predetermined threshold value and for converting the received signals into one of at least two logic levels.

2. The transmission system of claim 1, wherein a laminate comprising said metallic shield and a plastic covering is wrapped about said spacing member.

3. The transmission system of claim 1, wherein the twist lengths vary between about 10 to 70 times the outer diameter of one of the insulated conductors.

4. The transmission system of claim 1, wherein the twist lengths of said twisted pairs are constant.

5. The transmission system of claim 1, wherein each of said individually insulated conductors is insulated with dual layers of insulation comprising an inner layer of an expanded insulation and an outer layer of a solid insulation.

6. The transmission system of claim 1, wherein each insulated conductor includes a metallic portion enclosed in an insulation cover and the insulation cover of each said conductor is relatively thin.

7. The transmission system of claim 1, wherein the conductor pairs are packed loosely in the core to minimize pair meshing.

8. The transmission system of claim 7, wherein the pairs are assembled together such that each pair is disposed in a circle having a diameter equal to twice the outer diameter of an insulated conductor and such that the circle which circumscribes the cross-sectional areas of the conductors of each pair is substantially uninterrupted by the circumscribed circle of any adjacent pair.

9. The data transmission system of claim 1, wherein said driving means is effective to cause the transmitted data signals to be transmitted synchronously.

10. The data transmission system of claim 1, wherein said driving means is effective to cause data signals to be transmitted unidirectionally.

11. The data transmission system of claim 1, wherein said driving means is effective to cause the data signals to be transmitted unidirectionally synchronously.

12. The transmission system of claim 11, wherein the system is such that said driving means is capable of providing unidirectional synchronous high speed data streams at a substantially uniform velocity of propagation for each pair over relatively long distances.

13. A cable which is capable of relatively high rate, substantially error-free data transmission, said cable comprising:

a core which includes a plurality of twisted pairs of individually insulated conductors wherein the manner in which the pairs are disposed in the core which inhibits substantially pair meshing and the twist lengths, which are relatively short, cause the pairs to be decoupled sufficiently from one another to allow substantially error-free data transmission over relatively long distances, the pairs being assembled together such that each pair is disposed in a circle having a diameter equal to twice the outer diameter of an insulated conductor and such that the circle which circumscribes the cross-sectional areas of the insulated conductors of each pair is substantially uninterrupted by the circumscribed circle of any adjacent pair;

a metallic shield which encloses said core;

an inner jacket which is interposed between said core and said metallic shield and which has a relatively low dielectric constant, and wherein said inner jacket comprises a plastic material and has a thickness in the range of about one-third to three times the outer diameter of each insulated conductor; and an outer jacket which comprises a plastic material and which encloses said metallic shield.

14. The cable of claim 13, wherein a laminate comprising said metallic shield and a plastic covering is disposed about said inner jacket with the plastic covering facing outwardly.

15. The cable of claim 13, wherein said inner jacket comprises a strip of dielectric material which is wrapped about said core.

16. The cable of claim 13, wherein the twist lengths vary between about 10 to 70 times the outer diameter of one of the insulated conductors.

17. The cable of claim 16, wherein the twist lengths of said twisted pairs vary among the pairs.

18. The cable of claim 16, wherein each of the insulated conductors includes a 26 gauge metallic portion and the twist lengths vary between about 0.25 inch and about 1.6 inches.

19. The cable of claim 13, wherein the twist lengths of the twisted pairs are constant.

20. The cable of claim 13, wherein each insulated conductor includes a metallic portion enclosed in an insulation cover and the insulation cover of each conductor has a thickness which is equal to the product of about 0.1 to 1.0 and the diameter of the metallic portion.

21. The cable of claim 13, wherein the insulation has a relatively high dielectric constant.

22. A method of making a cable for use in a substantially error-free data transmission system, said method comprising the steps of:

advancing a metallic conductor along a path of travel;

providing the metallic conductor with an insulation cover;

associating two of the metallic conductors to provide a pair of conductors, the conductors being twisted about each other to form a twisted pair having a relatively short twist length which falls in the range of about 10 to 70 times the outer diameter of the insulation cover;

gathering together a plurality of twisted pairs to provide a core such that a circle which circumscribes the cross sectional areas of the insulated conductors of each pair is substantially uninterrupted by the circumscribed circle of any adjacent pair which substantially minimizes packing of adjacent pairs of the conductors;

enclosing the core in an inner jacket which is made of a material having a relatively low dielectric constant;

enclosing the inner jacket with a metallic shield; and enclosing the shield in an outer jacket which is made of a plastic material.

* * * * *